United States Patent
Benito Lopez

(10) Patent No.: US 12,422,696 B2
(45) Date of Patent: Sep. 23, 2025

(54) OPHTHALMIC LENSES AND METHODS RELATING THERETO

(71) Applicant: CooperVision International Limited, Fareham (GB)

(72) Inventor: Pablo Benito Lopez, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 19/101,356

(22) PCT Filed: Oct. 26, 2023

(86) PCT No.: PCT/GB2023/052796
§ 371 (c)(1),
(2) Date: Feb. 5, 2025

(87) PCT Pub. No.: WO2024/094967
PCT Pub. Date: May 10, 2024

(65) Prior Publication Data
US 2025/0258390 A1    Aug. 14, 2025

Related U.S. Application Data

(60) Provisional application No. 63/420,734, filed on Oct. 31, 2022.

(51) Int. Cl.
*G02C 7/04* (2006.01)
*G02C 7/02* (2006.01)

(52) U.S. Cl.
CPC ............. *G02C 7/044* (2013.01); *G02C 7/027* (2013.01)

(58) Field of Classification Search
CPC ................................. G02C 7/044; G02C 7/027
(Continued)

(56) References Cited

U.S. PATENT DOCUMENTS

| | | | |
|---|---|---|---|
| 11,934,043 B2 * | 3/2024 | Webber | ............... A61F 2/1618 |
| 2012/0075580 A1 | 3/2012 | Roffman et al. | |
| 2018/0024380 A1 | 1/2018 | Vu et al. | |
| 2022/0244569 A1 | 8/2022 | Galinier | |

FOREIGN PATENT DOCUMENTS

| | | |
|---|---|---|
| CN | 107643608 A | 1/2018 |
| CN | 111103701 A | 5/2020 |

(Continued)

OTHER PUBLICATIONS

International Search Report and Written Opinion issued in corresponding International Patent Application No. PCT/GB2023/052796 mailed Feb. 2, 2024 (13 pages).

(Continued)

*Primary Examiner* — Tuyen Tra
(74) *Attorney, Agent, or Firm* — Kilyk & Bowersox, P.L.L.C.

(57) ABSTRACT

An ophthalmic lens (101), methods of manufacturing such a lens (101), and methods of designing such a lens (101) are described. The lens (101) includes an optic zone (103) centred on an optical axis (102) and a peripheral zone (105) surrounding the optic zone (103). Within the optic zone (103), along a first meridian (107*a*), the lens (101) has a first radial power profile that varies continuously in a first radial direction from the optical axis (102) to the peripheral zone (105). Along a second, different meridian (107*b*), the lens has a second, different radial curvature power profile that varies continuously in a second radial direction from the optical axis (102) to the peripheral zone.

18 Claims, 12 Drawing Sheets

(58) Field of Classification Search
USPC .............................................. 351/41, 159.41
See application file for complete search history.

(56) References Cited

FOREIGN PATENT DOCUMENTS

| EP | 0764870 A1 | 3/1997 |
|---|---|---|
| TW | 201234071 A | 8/2012 |
| WO | 2009017403 A1 | 2/2009 |
| WO | 2020260679 A1 | 12/2020 |
| WO | 2021220005 A1 | 11/2021 |

OTHER PUBLICATIONS

PCT Demand filed Aug. 8, 2024 in corresponding International Patent Application No. PCT/GB2023/052796 (21 pages).
Second Written Opinion issued in corresponding International Patent Application No. PCT/GB2023/052796 dated Aug. 27, 2024 (5 pages).
Response to Second Written Opinion filed Oct. 15, 2024 in corresponding International Patent Application No. PCT/GB2023/052796 (17 pages).
PCT Notification Concerning Informal Communication issued in corresponding International Patent Application No. PCT/GB2023/052796 mailed Nov. 29, 2024 (3 pages).
Response to Informal Communication filed Dec. 6, 2024 in corresponding International Patent Application No. PCT/GB2023/052796 (14 pages).
International Preliminary Report on Patentability issued in corresponding International Patent Application No. PCT/GB2023/052796 mailed Jan. 27, 2025 (15 pages).
Office Action issued in corresponding Taiwan Patent Application No. 112140985 issued Apr. 25, 2024 (7 pages).
Office Action issued in corresponding Chinese Patent Application No. 202380063367.5 issued Jun. 21, 2025 (15 pages).

* cited by examiner

OPHTHALMIC LENSES AND METHODS RELATING THERETO

This application is a National Stage Application of PCT/GB2023/052796, filed Oct. 26, 2023, which claims priority to U.S. patent application Ser. No. 63/420,734, filed Oct. 31, 2022.

TECHNICAL FIELD

The present disclosure relates especially, but not exclusively, to ophthalmic lenses for slowing the progression of myopia and for use by presbyopes, the lenses having a varying power profile. The present disclosure also relates to methods of manufacturing such lenses, and methods of designing such lenses.

BACKGROUND

Many people, including children and adults require ophthalmic lenses to correct for myopia (short-sightedness) and many adults may require lenses to correct for presbyopia (an age-related inability to accommodate and hence inability to focus on near objects). Ophthalmic lenses may also be required to correct for hyperopia (far-sightedness), astigmatism, or keratoconus (a condition whereby the cornea gradually bulges to form a cone shape).

Without optical correction, myopic eyes focus incoming light from distant objects to a location in front of the retina. Consequently, the light converges towards a plane in front of the retina beyond which it then diverges, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

In a presbyopic eye, the crystalline lens does not change shape effectively to accommodate for near objects, and therefore people with presbyopia cannot focus on near objects. Conventional lenses (e.g., spectacle lenses and contact lenses) for correcting presbyopia include bifocal or progressive lenses, which include regions that are optimised for near vision and regions that are optimised for distance vision. Presbyopia may also be treated using bifocal or multifocal lenses, or monovision lenses (wherein different prescriptions are provided for each eye, one eye being provided with a distance vision lens, and one eye being provided with a near vision lens).

It was suggested several decades ago that progression of myopia in children or young people could be slowed or prevented by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach is to provide lenses having both regions that provide full correction of distance vision and regions that under-correct, or deliberately induce, myopic defocus. Lenses may also be provided that increase scattering of light in certain regions, compared to light passing through the fully correcting region of the lens. It has been suggested that these approaches can prevent or slow down the development or progression of myopia in children or young people, whilst providing good distance vision.

In the case of lenses having regions that provide defocus, the regions that provide full-correction of distance vision are usually referred to as base power regions and the regions that provide under-correction or deliberately induce myopic defocus are usually referred to as myopic defocus regions or add power regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e., closer to the lens), whilst the distance power region(s) are designed to focus light and form an image at the retina (i.e., further away from the lens). When a lens wearer is viewing near targets and using accommodation to focus light that passes through the distance power region(s), the add power region(s) will focus light in front of the retina.

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e., the eye's natural ability to change focal length) to bring nearby objects into focus, in theory, wearers could make use of the additional annular add power region to focus near objects; in other words, wearers can inadvertently use the lenses in the same manner as presbyopia correction lenses are used, which is undesirable for young subjects.

Further lenses have been developed which can be used in the treatment of myopia. In these lenses, the annular region is configured such that no single, on-axis image is formed in front of the retina, thereby preventing such an image from being used to focus near targets and avoid the need for the eye to accommodate. Rather, distant point light sources are imaged by the annular region to a ring-shaped focal line at a near add power focal surface, leading to a small spot size of light, without a surrounding 'halo' effect, on the retina at a distance focal surface.

For treating myopia, it is recognised that it may be beneficial to provide a lens that introduces additional myopic defocus. For treating presbyopia, it may be beneficial to provide a lens that gives rise to an extended depth of focus. The present disclosure seeks to provide such a lens. Such lenses may also be beneficial in correcting or improving vision associated with hyperopia, astigmatism, keratoconus or other refractive anomalies.

SUMMARY

According to a first aspect, the present disclosure provides an ophthalmic lens as described herein.

According to a second aspect, the present disclosure provides a method of manufacturing a lens as described herein.

According to a second aspect, the present disclosure provides a method of designing a lens as described herein.

It will of course be appreciated that features described in relation to one aspect of the present disclosure may be incorporated into other aspects of the present disclosure. For example, the method of the disclosure may incorporate features described with reference to the apparatus of the disclosure and vice versa.

DESCRIPTION OF THE FIGURES

Embodiments of the present invention will now be described by way of example only with reference to the accompanying schematic drawings of which.

DETAILED DESCRIPTION

Figure 1:
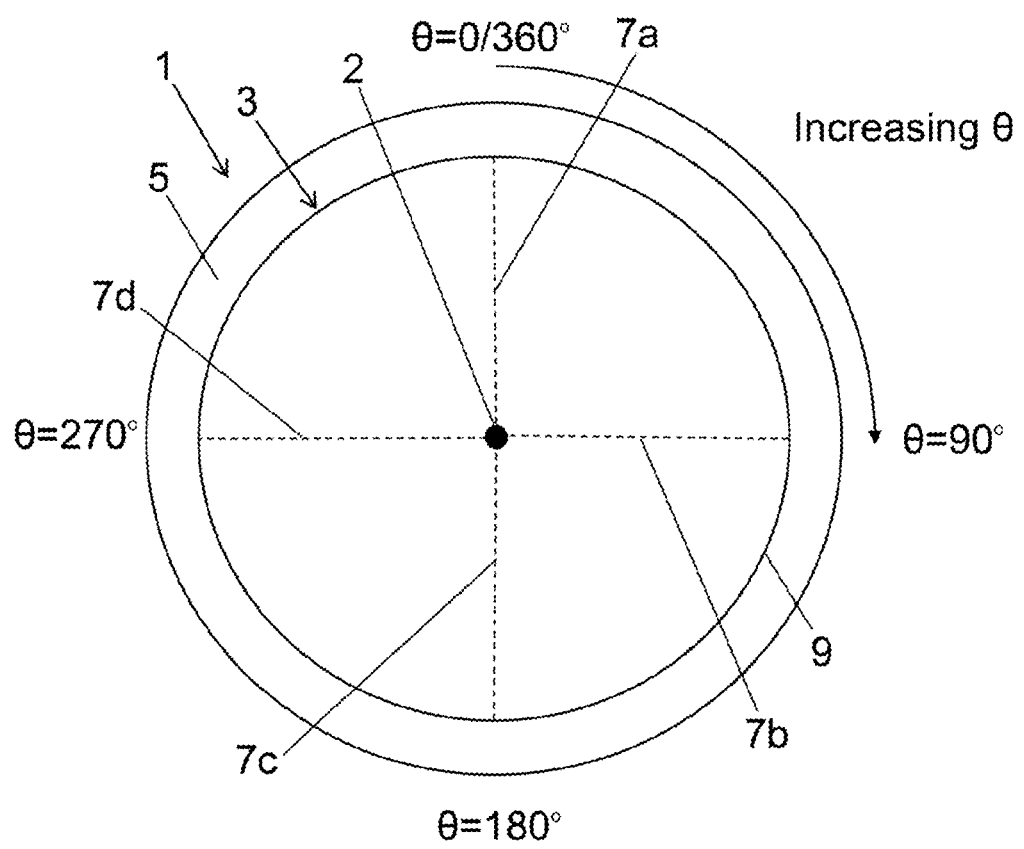
FIG. 1 is a diagram showing how the direction of a meridian is defined in relation to a lens.

According to a first aspect, the present disclosure provides an ophthalmic lens. The lens includes an optic zone centred on an optical axis, and a peripheral zone surrounding the optic zone. Within the optic zone, along a first meridian the lens has a first radial curvature power profile that varies continuously in a first radial direction from the optical axis to the peripheral zone. Along a second meridian the lens has a second, different radial curvature power profile that varies continuously in a second radial direction from the optical axis to the peripheral zone.

The ophthalmic lens may be a spectacle lens. The ophthalmic lens may be a contact lens.

A spectacle lens may comprise PMMA, CR-39, polycarbonate, Trivex, or crown glass.

As used herein, the term contact lens refers to a lens that can be placed onto the anterior surface of the eye. It will be appreciated that such a contact lens will provide clinically acceptable on-eye movement and not bind to the eye or eyes of a person. The ophthalmic lens may be a corneal lens (e.g., a contact lens that rests on the cornea of the eye). The ophthalmic lens may be a soft contact lens, such as a hydrogel contact lens or a silicone hydrogel contact lens. The ophthalmic lens may be a rigid contact lens.

The ophthalmic lens may be a lens for use in preventing or slowing the development or progression of myopia. The lens may be a lens for use in providing an extended depth of focus to a presbyopic eye.

An ophthalmic lens according to the present disclosure comprises an optic zone. The optic zone encompasses the parts of the lens that have optical functionality. The optic zone is configured to be positioned over the pupil of an eye when in use. For ophthalmic lenses according to the present disclosure, the optic zone comprises a small central region, and an annular region that surrounds the central region.

Ophthalmic lenses according to embodiments of the present disclosure include a peripheral zone surrounding the optic zone. The peripheral zone is not part of the optic zone, but surrounds the optic zone and sits outside the optic zone. For embodiments of the present disclosure wherein the ophthalmic lens is a contact lens, the peripheral zone sits above the iris when the lens is worn, and it provides mechanical functions, for example, increasing the size of the lens thereby making the lens easier to handle, providing ballasting to prevent rotation of the lens, and/or providing a shaped region that improves comfort for the lens wearer. The peripheral zone may extend to the edge of the contact lens. The peripheral zone may have a substantially circular outer perimeter. In embodiments of the present disclosure wherein the ophthalmic lens is a spectacle lens, the peripheral zone surrounds the optic zone and sits outside the optic zone. The peripheral zone may have a substantially circular outer perimeter. The peripheral zone may have a substantially elliptical, oval, or rectangular outer perimeter. The peripheral zone may extend to the edge of the spectacle lens. The peripheral zone may be surrounded by a further zone that is not optically active.

For embodiments of the present disclosure wherein the ophthalmic lens is a contact lens, the peripheral zone may include a ballast to orient the lens when positioned on the eye of a wearer. Embodiments of the present disclosure that incorporate a ballast into the contact lens will, when placed on the eye of a wearer, rotate under the action of the wearer's eyelid to a pre-determined angle of repose; for example, the ballast may be a wedge and the rotation may result from the action of the eyelid on the wedge. It is well-known in the art to ballast a contact lens to orient a contact lens; for example, toric contact lenses are ballasted to orient the lens so that the orthogonal cylindrical corrections provided by the lens align correctly for the astigmatism of the wearer's eye.

For embodiments of the present disclosure wherein the ophthalmic lens is a spectacle lens, the lens may be substantially circular in shape. The lens may be elliptical in shape. The lens may be oval in shape. The lens may be rectangular in shape. The lens may be square in shape. An anterior surface of the lens may have an area of between 1200 mm² and 3000 mm².

In embodiments of the present disclosure wherein the ophthalmic lens is a contact lens, the lens may be substantially circular in shape, and may have a diameter from about 4 mm to about 20 mm.

The optic zone of the ophthalmic lens may be substantially circular in shape and may have a diameter from about 2 mm to about 10 mm.

For embodiments of the present disclosure wherein the ophthalmic lens is a contact lens, the contact lens may have a diameter from 13 mm to 15 mm, and the optic zone may have a diameter from 7 mm to 9 mm.

The optical axis of the lens is defined with reference to a distant point source of light. Light from a distant point source that is on the optical axis of the lens (which may hereafter be referred to as an on-axis distant point source) will be focused onto the optical axis of the lens. The optical axis may lie along the centreline of the lens. For example, where the lens is a contact lens, the optical axis generally lies along the centreline of the lens. However, the optical axis may of course not lie along the centreline of the lens; this may be the case in a spectacle lens, where the position of the optical axis of the lens will be determined by the interpupillary distance of the wearer, which, depending on the lens geometry, may not coincide with the centreline of the lens.

The power of the lens within the optic zone can be defined as radial curvature power, a circumferential curvature power, a radial sagittal power, and a circumferential sagittal power.

In ophthalmology, the word "sagittal" is used in two different ways, in describing oblique astigmatism and in describing optical surfaces.

In general optics, the word "sagittal" is used when describing oblique astigmatism. Oblique astigmatism occurs when rays from an off-axis location pass through a lens obliquely. The astigmatism is mostly attributable to the cosine compression that occurs in the meridian along which the rays originate, e.g., if the rays originate from the horizontal peripheral field, the surface (and hence radius of curvature) horizontally will appear to be cosine compressed, resulting in increased power in that meridian (and hence astigmatism). The power in that meridian is labelled "tangential" power and the power in the perpendicular meridian is labelled "sagittal" power. The astigmatism results in object points being imaged to two spatially separated and orthogonal line foci, the sagittal focal line and the tangential focal line.

The second use of the word "sagittal" originates in descriptions of optical surfaces, for example in ophthalmology, where it is central to the clinical measurement of the anterior eye surface (i.e., in corneal topography). Sagittal optical power is determined by the slope of the optical surface along a given direction; it is also referred to as slope-based power. Terms including "sagittal power", "slope power" and "axial power" are synonyms used interchangeably. Curvature power is determined by the local curvature of the optical surface along a given direction.

In the present disclosure, the terms sagittal and curvature power may be used in the context of an optical surface, to describe the power of a surface of an ophthalmic lens.

Both the sagittal and curvature powers are defined along a given direction. For ophthalmic lenses according to embodiments of the present disclosure, the radial sagittal and radial curvature powers are along a direction extending radially outwards from the optical axis of the lens. The circumferential sagittal and circumferential curvature powers are along a direction that is perpendicular to that radial direction.

For a lens with co-axial optics, in the paraxial approximation, values of sagittal power and curvature power can be similar or identical. However, the values of the slope and the curvature powers can be very different from each other for some recently developed myopia-control lenses that employ non-coaxial optics. These lenses have surface regions that focus light from an on-axis source onto regions displaced from the optical axis, so that the distance at which local ray bundles from the source come to a focus can be very different from the distance at which they cross the optical axis. For these types of lenses, the distinction between sagittal and curvature power becomes important. With non-coaxial optics, a description of the curvature power does not provide a complete description of the optics. Adjacent regions of a lens can have the same curvature power but not the same sagittal power (because rays from each region cross the axis at different distances from the local focal distance and from each other). For a lens that includes non-coaxial lenslets, for example, the resulting sagittal and curvature power values differ significantly. A curvature power map of such a lens shows the constant add power of each lenslet, but a sagittal power map reveals a declining sagittal power with increasing radial distance.

Sagittal power is directly linked to the ray location at the image plane (retina plane in the eye) and therefore directly linked with image quality. This is not necessarily the case for curvature power when non-coaxial optics are implemented.

Sagittal and curvature powers of ophthalmic lenses can be determined by measuring a wavefront of light passing through a lens. When describing optical wavefronts that have passed through a lens, the radial sagittal power of a lens at a given point is related to the first derivative of the wavefront, as it is calculated as the slope of the wavefront divided by the radial distance (r) from the optical axis of the lens (typically the centre of the lens). The radial (local) curvature power at that point is calculated as the second derivative of the wavefront.

An example way, in practice, to measure the wavefront of light passing through an ophthalmic lens is to use an aberrometer, for example a Shack-Hartmann aberrometer with a (monochromatic, i.e., narrow-band) 540 nm light source, such as ClearWave® (available, from www.lumetrics.com). A Shack-Hartmann aberrometer includes a planar regular array of small lenses. In use, the wavefront to be measured is sampled by a two-dimensional array of small lenses (lenslets) each focusing a different part of the wavefront to a different focal spot. If the wavefront is planar, the spatial arrangement of the resulting point spread functions will mirror the arrangement of the lenses, so the lenses focus the wavefront to a corresponding regular array of focal spots.

Aberrometer-derived measures of optical wavefronts are typically quantified relative to standard reference cases. For example, when the Shack-Hartmann aberrometer is being used, the standard reference is typically a planar wavefront passing through the two-dimensional array of small lenses (lenslets), as just described.

The effect of a given lens on the wavefront is measured by inserting the lens into the measurement path at a location optically conjugate with the lenslet array. A planar wavefront then passes through the two-dimensional array of lenslets, and through the lens.

For a simple lens, the resulting wavefront will be a diverging or converging wavefront which produces an array of points that are displaced relative to their positions when the lens is absent. In practice, the magnitude and direction of the displacement of the points may also result from additional aberrations of the lens. A wavefront error map is determined by measuring the displacement of the shifted points from the regular array of focal spots, and the wavefront error map can be used to calculate the sagittal and curvature power of the lens.

The wavefront error map may be measured at intervals across the lens, for example across the optic zone of a contact lens; for example, the Shack-Hartmann aberrometer may be used to measure the wavefront error map every 104 µm across a 10 mm aperture.

For lenses described herein and according to embodiments of the present disclosure, the radial sagittal power (i.e., slope power or axial power) at a given location is the first derivative with respect to r of the wavefront error (i.e. the wavefront error slope, which may for example be obtained from a wavefront error map), divided by r, where r is the radial distance of that location from the optical axis of the lens; so radial sagittal power is defined as $$P^{radial}_{sagittal} = \frac{1}{r} \frac{\partial W}{\partial r}$$

For lenses described herein and according to embodiments of the present disclosure, the radial curvature power at a given location is the second derivative with respect to r of the wavefront error (which may for example be obtained from a wavefront error map), where r is the radial distance of that location from the optical axis of the lens; so radial curvature power is defined as:

$$P^{radial}_{curvature} = \frac{\partial^2 W}{\partial r^2}$$

The term meridian is used herein to describe a line within the optic zone that extends radially outwards from the optical axis to a point on a boundary between the optic zone and the peripheral zone. The direction of a meridian around the optic zone can be defined by an angle θ, where θ varies between 0° and 360°. This is illustrated in FIG. 1. FIG. 1 shows a lens 1, the lens having an optic zone 3 centred on an optical axis 2. A peripheral zone 5 surrounds the optic zone 3. A first example meridian 7a, lies along the line θ=0/360° and extends from the optical axis 2 to the boundary 9 of the optic zone 3 and the peripheral zone 5. A second example meridian 7b, lies along the line θ=90° and extends from the optical axis 2 to the boundary 9 of the optic zone 3 and the peripheral zone 5. A third example meridian 7c, lies along the line θ=180° and extends from the optical axis 2 to the boundary 9 of the optic zone 3 and the peripheral zone 5. A fourth example meridian 7d, lies along the line θ=270° and extends from the optical axis 2 to the boundary 9 of the optic zone 3 and the peripheral zone 5. Although only four orthogonal meridians are shown in FIG. 1, meridians lie along lines at all values of θ, i.e., 0°<=θ<360°. In addition, the degrees of each meridian are in reference to the accompanying drawings. It can be appreciated that in the field of contact lenses, for example, the 90 degree meridian shown in FIG. 1 can be understood to be the 0/360 degree meridian in practice, and that the 0/360 degree meridian shown in FIG. 1 can be understood to be the 90 degree meridian, such that the degrees of each meridian increase in a counter-clockwise direction.

In embodiments of the present disclosure, the radial curvature power of the optic zone varies continuously (i.e., with a smooth and continuous change in value) in a radial direction along a first meridian (i.e., in a radial direction extending outwardly from the optical axis of the lens to a point in the boundary between the optic zone and the peripheral zone), giving rise to a first radial curvature power profile. A first average radial curvature power can be defined as the average radial curvature power value measured along a meridian having the first radial curvature power profile.

At or towards the optical axis, the first radial curvature power profile may provide a distance power. At the optical axis, the first radial curvature power profile may provide a power of between +0.5 dioptres (D) and −25.0 D. The first radial curvature power profile may provide a power of between −0.25 D and −15.0 D. Alternatively, the first radial curvature power profile may provide a near power. At the optical axis, the first radial curvature power profile may provide a power of between +0.5 dioptres D and +25.0 D. At the optical axis the first radial curvature power profile may provide a power of between +0.5 dioptres (D) and +10.0 D.

In embodiments of the present disclosure, along at least one second, different meridian within the optic zone (i.e., a second radial direction extending outwardly from the optical axis of the lens to a point on the boundary between the optic zone and the peripheral zone), the radial curvature power also varies continuously (i.e., with a smooth and continuous change in value), but shows different variation in radial curvature power to the first radial curvature power profile, thereby giving rise to a second, different radial curvature power profile. A second average radial curvature power can be defined as the average radial curvature power value taken along a meridian having the second radial curvature power profile. The second average radial curvature power may be different to the first average radial curvature power. The second average radial curvature power may be the same as the first average radial curvature power.

Advantageously, lenses according to embodiments of the present disclosure that have different curvature power profiles along different meridians, may allow relaxation of the eye muscles. This may be particularly useful in lenses for improving vision at daily working distances and may give rise to an anti-fatigue effect.

At or towards the optical axis, the second radial curvature power profile may provide a distance power. At the optical axis, the second radial curvature power profile may provide a power of between +0.5 dioptres (D) and −25.0 D. The second radial curvature power profile may provide a power of between −0.25 D and −15.0 D. Alternatively, the second radial curvature power profile may provide a near power. At the optical axis, the second radial curvature power profile may provide a power of between +0.5 dioptres D and +25.0 D. At the optical axis, the second radial curvature power profile may provide a power of between +0.5 dioptres (D) and +10.0 D.

At the optical axis, the second radial curvature power profile may have the same radial curvature power as the first radial curvature power profile. Alternatively, the first radial power profile and the second radial curvature power profile may approach two different radial curvature power values. Towards the optical axis, the first curvature power profile or the second curvature power profile may provide a distance power, and the other of the first curvature power profile and the second curvature power profile may provide a near power. Advantageously, the lens may therefore provide both centre near power and centre distance power.

The first radial curvature power profile and the second radial curvature power profile may have the same or similar radial curvature power values at or towards the optical axis, but may have different radial curvature power values at or towards a boundary between the optic zone and the peripheral zone. Alternatively, the first radial curvature power profile and the second radial curvature power profile may have the same or similar may have different radial curvature power values at or towards a boundary between the optic zone and the peripheral zone.

Along the first radial curvature power profile, the radial curvature power may vary with an oscillating profile. Along the first radial curvature power profile, the radial curvature power may continually increase, or continually decrease. The first radial curvature power profile may have a monotonic decrease in radial curvature power with increasing radial distance from the optical axis, or a monotonic increase in radial curvature power with increasing radial distance from the optical axis. The gradient of the first radial curvature power profile may be constant, or may change with increasing radial distance from the optical axis. Along the first radial curvature power profile, the radial curvature power may vary in a pseudorandom manner.

Along the second radial curvature power profile, the radial curvature power may vary with an oscillating profile. Along the second radial curvature power profile, the radial curvature power may continually increase, or continually decrease. The second radial curvature power profile may show a monotonic decrease in radial curvature power with increasing radial distance from the optical axis, or a monotonic increase in radial curvature power with increasing radial distance from the optical axis. The gradient of the second radial curvature power profile may be constant, or may change with increasing radial distance from the optical axis. Along the second radial curvature power profile, the radial curvature power may vary in a pseudorandom manner.

The first radial curvature power profile may be selected to give rise to a desired first average radial curvature power value along a first meridian. The second radial curvature power profile may be selected to give rise to a second average radial curvature power along a second meridian.

The first radial curvature power profile may have substantially the same shape as the second radial curvature power profile, but the first average radial curvature power may be different to the second average radial curvature power. Alternatively, the first curvature power profile may have a first average radial curvature power value measured along the first meridian, and the second radial curvature power profile may also have the first average radial curvature power value, measured along the second meridian, and the first radial curvature power profile may have a different shape to the second radial curvature power profile.

The first radial curvature power profile may have an opposite shape to the second radial curvature power profile. For example, one of the first curvature power profile and the second curvature power profile may include at least one peak at a first radial distance from the optical axis of the lens, and the other of the first curvature power profile and the second curvature power profile may include at least one trough at a first radial distance from the optical axis of the lens. The first radial curvature power profile may comprise a series of peaks at a series of radial positions along a meridian, whilst the second radial curvature power profile may comprise a series of troughs at the same radial positions along a meridian. In this case, the first average radial curvature power may be the same as the second average radial curvature power, or it may be different to the second average radial curvature power. Herein, the term peak may be used to describe a maximum radial (i.e., most positive or least negative) curvature power value along a radial curvature power profile. The peak may be a global peak, i.e., the absolute maximum radial curvature power value along the radial curvature power profile, or a local peak, i.e., a maximum radial curvature power value compared to radial curvature power either side of the peak. The term trough may be used to describe a minimum (i.e., least positive or most negative) radial curvature power value along a radial curvature power profile. The trough may be a global trough, i.e., the absolute minimum radial curvature power value along the radial curvature power profile, or a local peak, i.e., a minimum radial curvature power value compared to the radial curvature power either side of the trough.

One of the first radial curvature power profile and the second radial curvature power profile may have a higher curvature power value (i.e., more positive or less negative) towards the optical axis than towards a boundary between the peripheral zone and the optic zone, and the other of the first radial curvature power profile and the second radial curvature power profile may have a lower curvature power value (i.e., less positive or more negative) towards the optical axis than towards a boundary between the peripheral zone and the optic zone. One of the first radial curvature power profile and the second radial curvature power profile may monotonically increase with increasing distance from the optical axis. The other of the first radial curvature power profile and the second radial curvature power profile may monotonically decrease with increasing distance from the optical axis.

The first radial curvature power profile may include at least one peak in radial curvature power. The first radial curvature power profile may include at least one trough in radial curvature power. The first radial curvature power profile may include multiple peaks and/or troughs in radial curvature power at different radial distances from the optical axis of the lens. Different peaks and/or troughs in the first radial curvature power profile may be global or local peaks and/or troughs, i.e., they may have different radial curvature power values. The second radial curvature power profile may include at least one peak in radial curvature power. The second radial curvature power profile may include at least one trough in radial curvature power. The second radial curvature power profile may include multiple peaks and/or troughs in radial curvature power at different radial distances from the optical axis of the lens. Different peaks and/or troughs in the second radial curvature power profile may be global or local peaks and/or troughs, i.e., they may have different radial curvature powers.

At least one peak and/or trough in the first radial curvature power profile may be at the same radial distance from the optical axis of the lens as at least one peak and/or trough in the second radial curvature power profile. Each peak and/or trough in the first radial curvature power profile may be at the same radial distance from the optical axis of the lens as each peak and/or trough in the second radial curvature power profile. Each peak in the first radial curvature power profile may be at the same radial distance from the optical axis of the lens as a trough in the second radial curvature power profile, or vice versa.

The first radial curvature power profile may span a power range of at least 2.0 D, preferably at least 5.0 D. The second radial curvature power profile may span a power range of at least 2.0 D, preferably at least 5.0 D. The first radial curvature power profile and the second radial curvature power profile may span a power range of the same magnitude, for example the first radial curvature power profile and the second radial curvature power profile may both span a 5.0 D power range. The first radial curvature profile and the second radial curvature power profile may span different absolute power values. A range of power values spanned by the first radial curvature power profile may overlap with a range of power values spanned by the second radial curvature power profile.

The first radial curvature power profile and the second radial curvature power profile may have substantially the same shape but may span different power values, which may be overlapping power ranges, or may be non-overlapping power values.

Within the optic zone, a first set of meridians may have the first curvature power profile and a second set of meridians may have the second curvature power profile. The first curvature power profile may have a first average radial curvature power, and therefore the first set of meridians may have the first average radial curvature power. The second radial curvature power profile may have a second average radial curvature power value, and therefore the second set of meridians may have the second average radial curvature power.

The first set of meridians may be distributed at regular intervals around of the optic zone (i.e., at regularly spaced θ values). The angular spacing between each meridian in the first set of meridians may be about 90°, about 45°, about 30°, about 20°, or about 10°. The angular spacing between each meridian in the first set of meridians may be less than 5°, less than 2°, less than 1°, or less than 0.5°. The second set of meridians may be distributed at regular intervals around of the optic zone (i.e., at regularly spaced θ values). The angular spacing between each meridian in the set of meridians may be about 90°, about 45°, about 30°, about 20°, or about 10°. The angular spacing between each meridian in the first set of meridians may be less than 5°, less than 2°, less than 1°, or less than 0.5°. The first set of meridians and the second set of meridians may be interleaved, and they may form an alternating pattern around the optic zone. The angular spacing between a meridian in the first set of meridians its adjacent meridian from the second set of meridians may be less than 5°, less than 2°, less than 1°, or less than 0.5°. The angular spacing between a meridian from the first set of meridians and an adjacent meridian from the second set of meridians may be sufficiently small that a lens wearer's eye cannot distinguish the two meridians.

The average radial curvature power of meridians in a first direction may be different from the average radial curvature power of meridians in a second, orthogonal, direction, resulting in a toric average power profile. For example, the second set of meridians may be orthogonal to the first set of meridians (i.e., each meridian in the first set of meridians, having the first average radial curvature power, may be orthogonal to a meridian in the second set of meridians, having the second average radial curvature power). As a result, the optic zone of the lens may have a toric power profile.

A first set of meridians distributed at regular intervals around the optic zone may have the first average radial curvature power and a second set of meridians distributed at regular intervals around the optic zone may have the second average curvature power profile. Alternatively, the second set of meridians having the second average radial curvature power may form an alternating pattern with the first set of meridians having the second average radial curvature power.

The first set of meridians and the second set of meridians may therefore result in a star-shaped power profile, with a periodic variation in radial curvature power moving in a circumferential direction around the optic zone. The angular spacing between a meridian from the first set of meridians, having the first average radial curvature power and an adjacent meridian from the second set of meridians, having the second average radial curvature power, may be less than 1°

Along at least one further meridian in the optic zone, the radial curvature power may vary with a third radial power profile that is different to the second curvature power profile and the first curvature power profile.

The radial curvature power profile along meridians within the optic zone may vary continuously with angle θ. Each meridian around the optic zone may have, at a different radial distance from the optical axis for each meridian, a peak in radial curvature power. The position of a peak or trough along each meridian, (i.e., the radial distance of the peak or trough from the optical axis of the lens) may therefore vary with angle θ. The position of the peak or trough around the circumference of the optic zone may define a portion of a spiral, i.e., the radial distance of the peak or trough from the optical axis may increase with increasing angle θ or may decrease with increasing angle θ.

The radial curvature power of the optic zone may result from a curvature of an anterior surface of the lens. The radial curvature power of the optic zone may result from a curvature of a posterior surface of the lens. The radial curvature power of the optic zone may result from the combination of curvatures of the anterior and posterior surfaces of the lens.

For embodiments of the present disclosure wherein the ophthalmic lens is a contact lens, the lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

Alternatively, the lens may comprise, consist essentially of, or consist of a silicone elastomer material. For example, the lens may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

According to a second aspect, the present disclosure provides a method of manufacturing a lens. The lens may include any of the features set out above in respect of the first aspect of the invention. The method may comprise forming a lens.

For embodiments of the present disclosure wherein the ophthalmic lens is a contact lens, the method of manufacturing may comprise forming a female mold member with a concave lens forming surface and a male mold member with a convex lens forming surface. The method may comprise filling a gap between the female and male mold members with bulk lens material. The method may further comprise curing the bulk lens material to forms the lens.

For embodiments of the present disclosure wherein the ophthalmic lens is a contact lens, the lens may be a formed using a lathing process. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

According to a third aspect, the present disclosure provides a method of designing a lens. The lens may include any of the features set out above. The method comprises selecting a first average radial curvature power value, and selecting a second, different average radial curvature power value. The method comprises designing a first curvature power profile that gives rise to the first average radial curvature power value and designing a second curvature power profile that gives rise to the first average radial curvature power value. The method comprises designing an optic zone for the lens, wherein the optic zone comprises meridians having the first curvature power profile and meridians having the second curvature power profile.

Figure 2A:
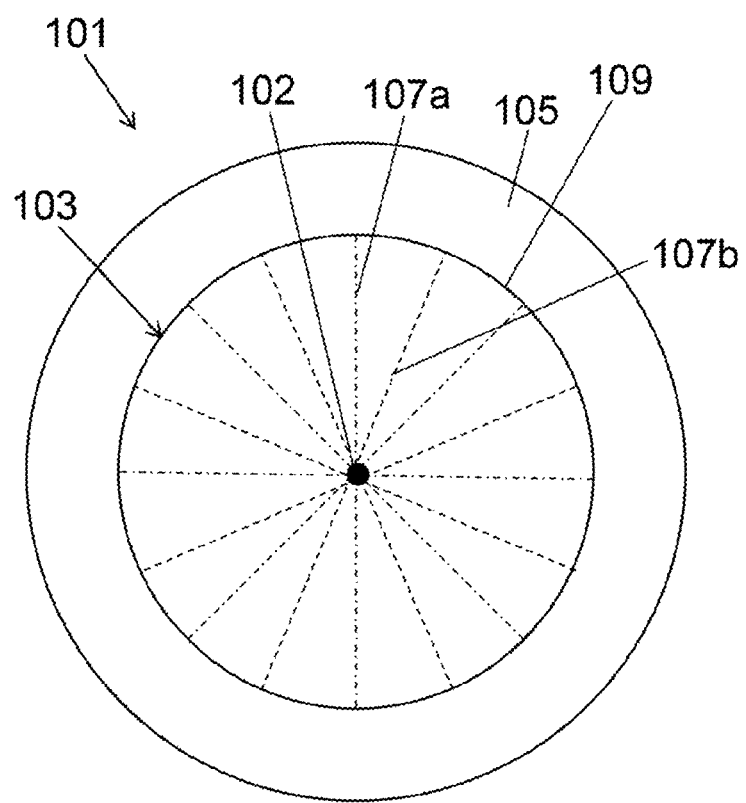
FIG. 2A is a schematic top view of a lens according to an embodiment of the present disclosure.
Figure 2B:
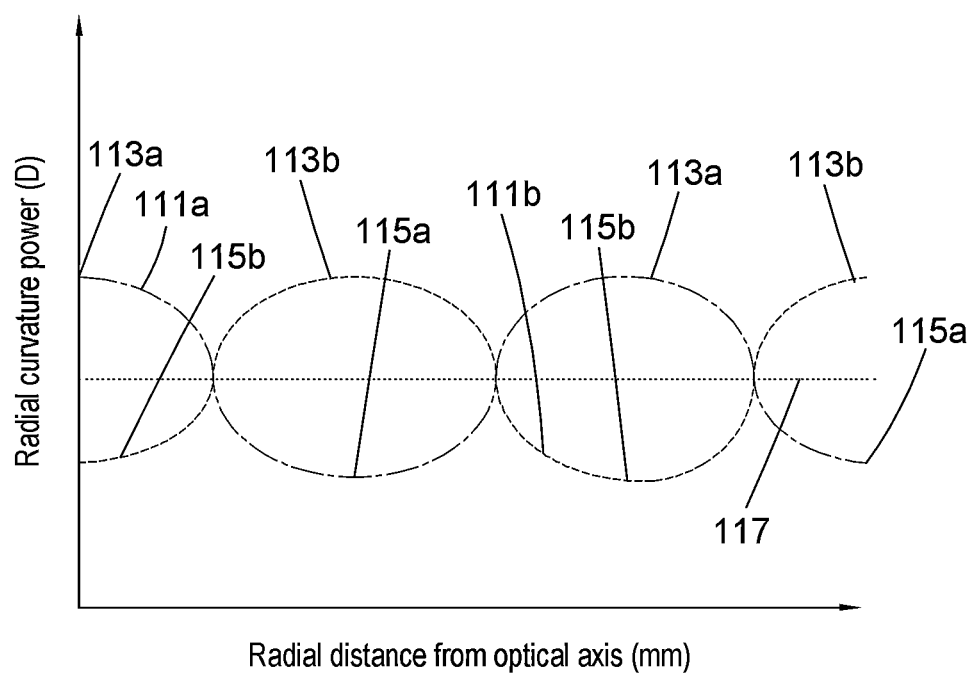
FIG. 2B is a plot showing the radial curvature power along two different meridians of the lens of FIG. 2A.

FIG. 2A shows a schematic top view of a lens 101 according to an embodiment of the present disclosure. The lens 101 includes an optic zone 103 centred on an optical axis 102, and a peripheral zone 105 surrounding the optic zone 103. A first meridian 107a, which forms part of a set of first meridians 107a (only a single meridian 107a is labelled, other meridians within the set are indicated with dot-dash lines), extends from the optical axis 102 to a boundary 109 of the optic zone 103 and the peripheral zone 105. Along the first meridian 107a, the radial curvature power varies smoothly and continuously and has a first radial curvature power profile 111a, as shown in FIG. 2B. The first radial curvature power profile 111a oscillates between peaks 113a and troughs 115a. Both peaks 113a have the same radial curvature power value, and both troughs 115a have the same radial curvature power value. A second meridian 107b extends from the optical axis 102 to the boundary 109 of the optic zone 103 and the peripheral zone 105. A second meridian 107b forms part of a set of second meridians 107b (only a single meridian 107b is labelled, other meridians within the set are indicated with dashed lines), and also has a radial curvature power that varies smoothly and continuously, with a second radial curvature power profile 111b, as shown in FIG. 2B. This second radial curvature power profile 111b also oscillates between peaks 113b and troughs 115b, but with an opposite variation to the first radial curvature power profile 111a, such that the troughs 115b of the second radial curvature power profile 111b are at the same radial distance from the optical axis 102 as the peaks 113a of the first radial curvature power profile 111a, and vice versa. The first radial curvature power profile 111a and the second radial curvature power profile 111b have the same average radial curvature power, indicated by the dotted line 117.

As shown in FIG. 2A, around the optic zone 103, there is an alternating and periodic pattern of meridians 107a from the first set having the first radial curvature power profile 111a (see FIG. 2B), and meridians 107b from the second set having the second radial curvature power profile 111b (see FIG. 2B). The angular spacing between each of the meridians 107a in the first set is approximately 45°, and the angular spacing between each of the meridians 107b in the second set is approximately 45°, such that the angular spacing between a meridian 107a from the first set and its adjacent meridians from the second set is approximately 22.5°

Figure 3A:
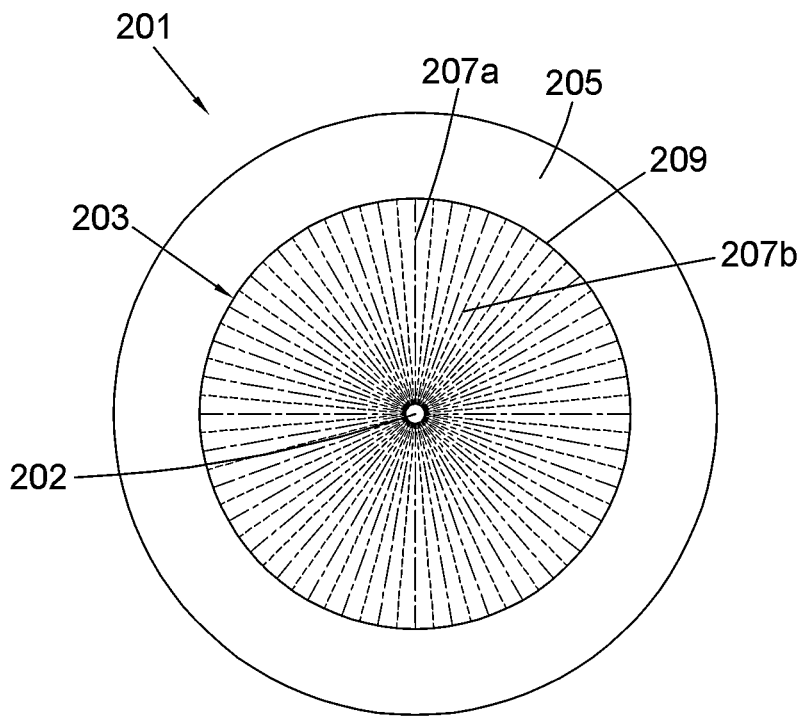
FIG. 3A is a schematic top view of a lens according to another embodiment of the present disclosure.
Figure 3B:
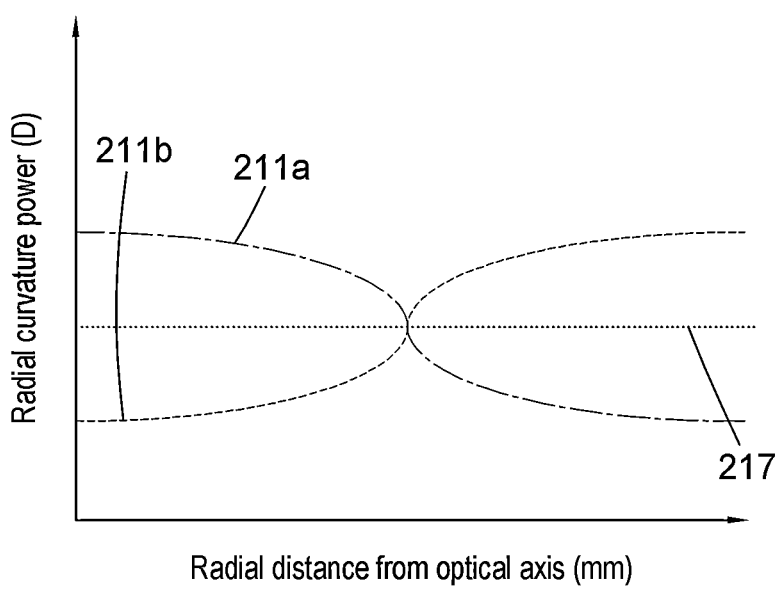
FIG. 3B is a is a plot showing the radial curvature power along two different meridians of the lens of FIG. 3A.

FIG. 3A shows a schematic top view of a lens 201 according to another embodiment of the present disclosure. The lens 201 includes an optic zone 203 centred on an optical axis 202, and a peripheral zone 205 surrounding the optic zone 203. A first meridian 207a, which forms part of a set of first meridians 207a (only a single meridian 207a is labelled, other meridians within the set are indicated with dot-dash lines), extends from the optical axis 202 to a boundary 209 of the optic zone 203 and the peripheral zone 205. Along the first meridian 207a, the radial curvature power varies smoothly and continuously and has a first radial curvature power profile 211a, as shown in FIG. 3B. The first radial curvature power profile 211a along this first meridian 207a is shown in FIG. 3B. The first radial curvature power profile 211a has a decreasing radial curvature power value with increasing distance from the optical axis 202. The gradient of the radial curvature power profile 211a varies with distance from the optical axis 202.

A second meridian 207b extends from the optical axis 202 to the boundary 209 of the optic zone 203 and the peripheral zone 205. Along a second meridian 207b, which forms part of a set of second meridians 207b (only a single meridian 207b is labelled, other meridians within the set are indicated with dashed lines), the radial curvature power also varies smoothly and continuously, and has a second radial curvature power profile 211b, as shown in FIG. 3B. The second radial curvature power profile 211b has an increasing radial curvature power value with increasing radial distance from the optical axis 202. The gradient of the radial curvature power profile 211b varies with distance from the optical axis 202. The second radial curvature power profile 211b shows an opposite variation to the first radial curvature power profile 211a. The first radial curvature power profile 211a and the second radial curvature power profile 211b have the same average radial curvature power, indicated by the dotted line 217.

As shown in FIG. 3A, around the optic zone 203, there is an alternating and periodic pattern of meridians 207a from the first set having the first radial curvature power profile 211a (see FIG. 3B), and meridians 207b from the second set having the second radial curvature power profile 211b (see FIG. 3B). The angular spacing between each of the meridians 207a in the first set is approximately 10°, and the angular spacing between each of the meridians 207b in the second set is approximately 10°, such that the angular spacing between a meridian 207a from the first set and its adjacent meridians 207b from the second set is approximately 5°.

Figure 4A:
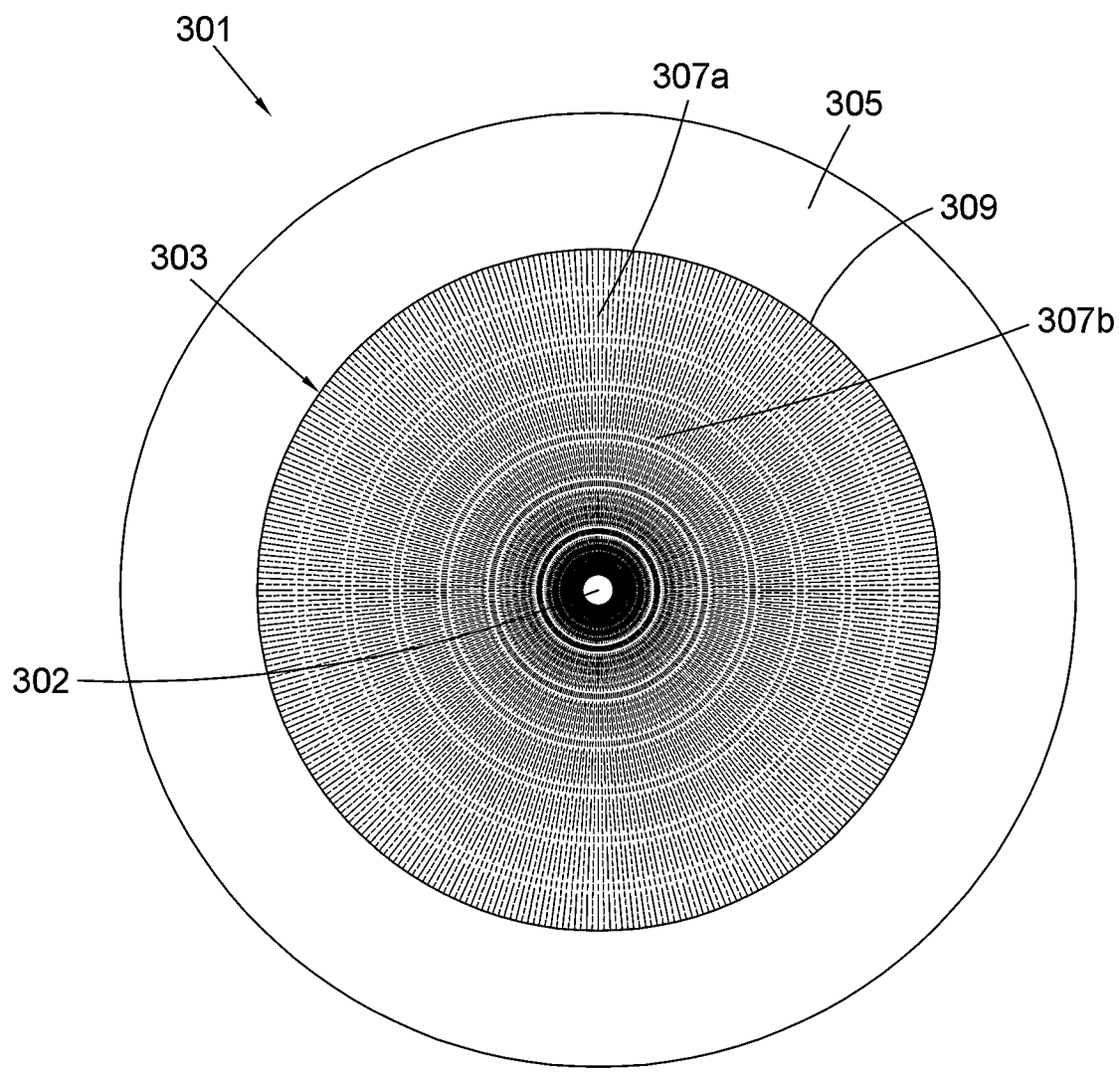
FIG. 4A is a schematic top view of a lens according to another embodiment of the present disclosure.
Figure 4B:
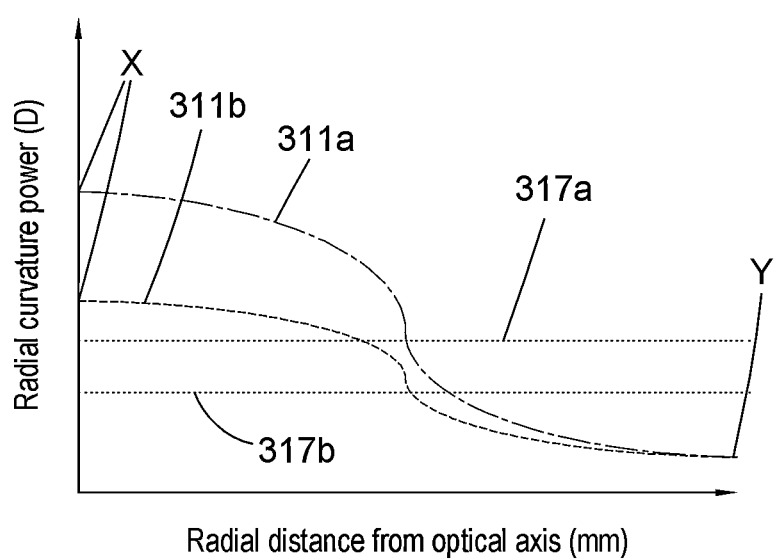
FIG. 4B is a is a plot showing the radial curvature power along two different meridians of the lens of FIG. 4A.

FIG. 4A shows a schematic top view of a lens 301 according to another embodiment of the present disclosure. The lens 301 includes an optic zone 303 centred on an optical axis 302, and a peripheral zone 305 surrounding the optic zone 303. A first meridian 307a, which forms part of a set of first meridians 307a (only a single meridian is labelled, other meridians 307a within the set are indicated with dot-dash lines), extends from the optical axis 302 to a boundary 309 of the optic zone 303 and the peripheral zone 305. Along the first meridian 307a, the radial curvature power varies smoothly and continuously, and has a first radial curvature power profile 311a, as shown in FIG. 4B. The first radial curvature power profile 311a along this first meridian 307a has a decreasing radial curvature power value with increasing distance from the optical axis 302. The gradient of the first radial curvature power profile 311a varies with distance from the optical axis 302. A second meridian 307b extends from the optical axis 302 to the boundary 309 of the optic zone 303 and the peripheral zone 305. Along the second meridian 307b, which forms part of a set of second meridians 307b (only a single meridian is labelled, other meridians 307b within the set are indicated with dashed lines), the radial curvature power also varies smoothly and continuously and has a second radial curvature power profile 311b, as shown in FIG. 4B. The second radial curvature power profile 311b along this second meridian 307b also has a decreasing radial curvature power value with increasing distance from optical axis 302.

At the optical axis 302, (indicated by the points labelled 'X' in FIG. 4B), the first radial curvature power profile 311a has a higher radial curvature power value than the second radial curvature power profile 311b. At a boundary between the optic zone 302 and the peripheral zone 305 (indicated by the point 'Y' in FIG. 4B), the first radial curvature power profile 311a has the same radial curvature power value as the second radial curvature power profile. The first radial curvature power profile 311a has a higher average radial curvature power (indicated by the dotted line 317a), than the average radial curvature power (indicated by dotted line 317b) of the second radial curvature power profile 311b.

As shown in FIG. 4A, around the optic zone 303, there is an alternating and periodic pattern of meridians 307a from the first set having the first radial curvature power profile 311a (see FIG. 4B), and meridians 307b from the second set having the second radial curvature power profile 311b (see FIG. 4B). The angular spacing between each of the meridians 307a in the first set is approximately less than 2°, and the angular spacing between each of the meridians 307b in the second set is approximately 2°, such that the angular spacing between a meridian 307a from the first set and its adjacent meridians 307b from the second set is less than 1°. When the lens 301 is worn by a lens wearer, the lens wearer's eye will not be able to resolve the two different radial curvature power profiles.

Figure 5A:
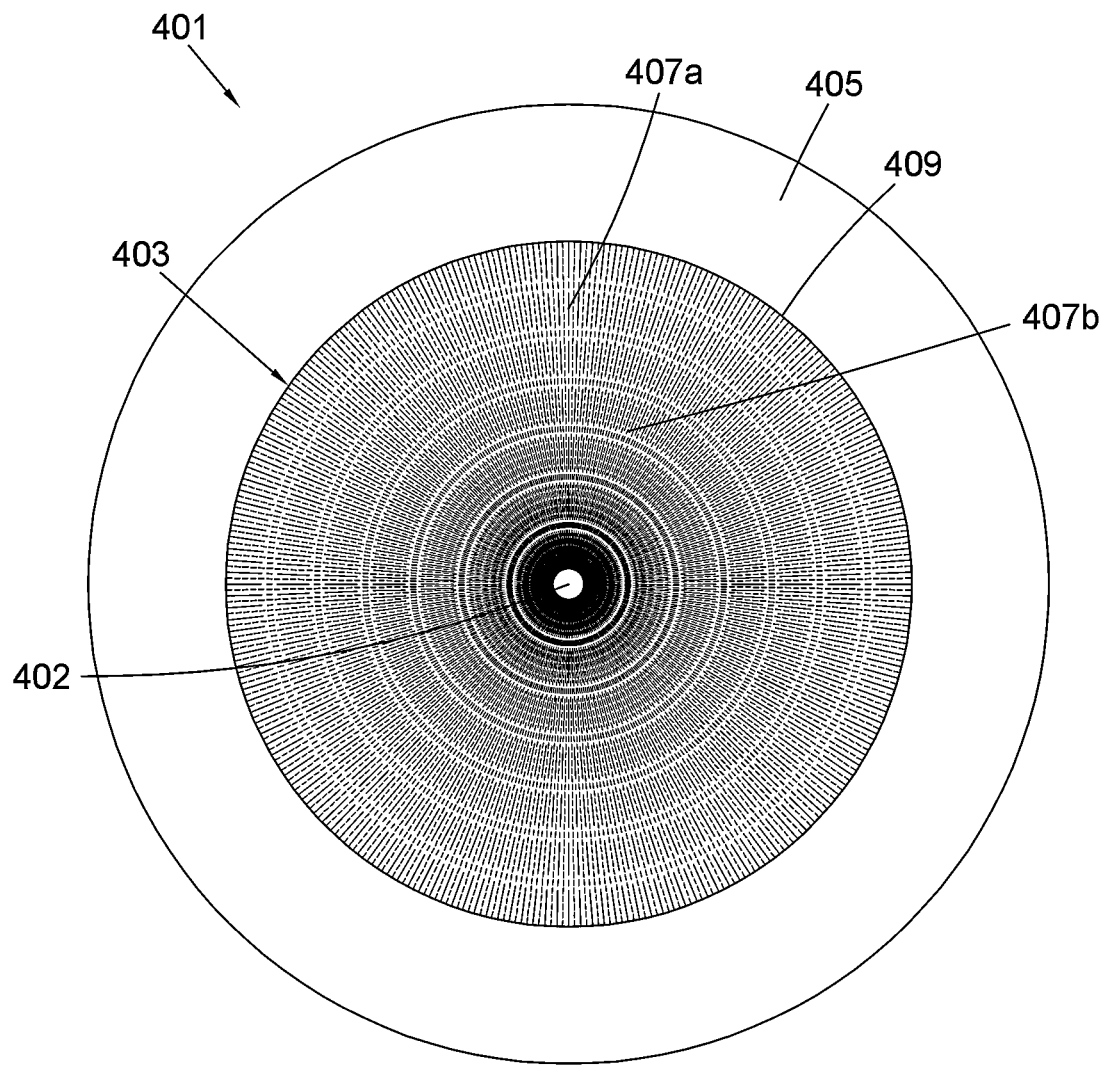
FIG. 5A is a schematic top view of a lens according to another embodiment of the present disclosure.
Figure 5B:
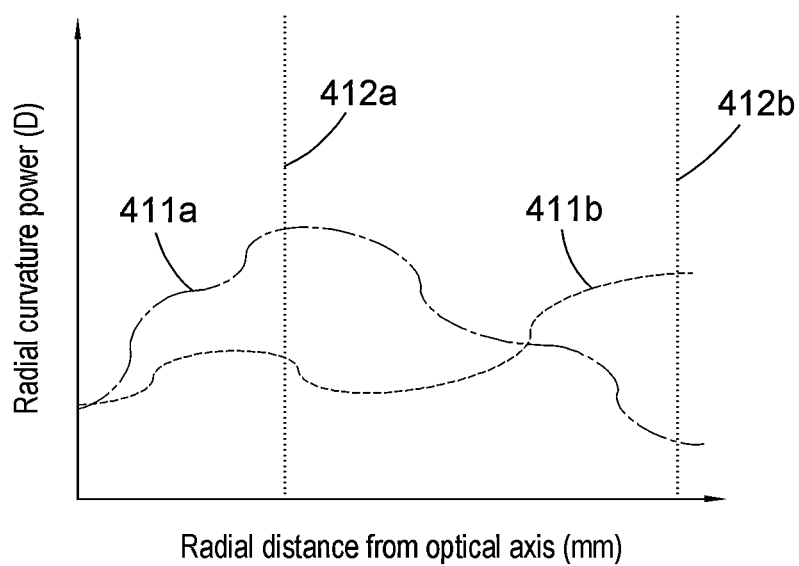
FIG. 5B is a is a plot showing the radial curvature power along two different meridians of the lens of FIG. 5A.

FIG. 5A shows a schematic top view of a lens 401 according to another embodiment of the present disclosure. The lens 401 includes an optic zone 403 centred on an optical axis 402, and a peripheral zone 405 surrounding the optic zone 403. A first meridian 407a, which forms part of a set of first meridians 407a (only a single meridian is labelled, other meridians 407a within the set are indicated with dot-dash lines), extends from the optical axis 402 to a boundary 409 of the optic zone 403 and the peripheral zone 405. Along the first meridian 407a, the radial curvature power varies smoothly and continuously, and has a first radial curvature power profile 411a, as shown in FIG. 5B. The first radial curvature power profile 411a along this first meridian 407a varies in a pseudo-random manner, with a peak in radial curvature power at a first radial distance from the optical axis (indicated by the dotted line 412a). The gradient of the first radial curvature power profile 411a varies with distance from the optical axis 402. A second meridian 407b extends from the optical axis 402 to the boundary 409 of the optic zone 403 and the peripheral zone 405. Along the second meridian 407b, which forms part of a set of second meridians 407b (only a single meridian is labelled, other meridians 407b within the set are indicated with dashed lines) the radial curvature power also varies smoothly and continuously having a second radial curvature power profile 411b, as shown in FIG. 5B. The second radial curvature power profile 411b along this second meridian 407b varies in a pseudo random manner with a peak in radial curvature power at a second, different distance from the optical axis (indicated by the dotted line 412b).

As shown in FIG. 5A, around the optic zone 403, there is an alternating and periodic pattern of meridians 407a from the first set having the first radial curvature power profile 411a (see FIG. 5B), and meridians 407b from the second set having the second radial curvature power profile 411b (see FIG. 5B). The angular spacing between each of the meridians 407a in the first set is approximately less than 2°, and the angular spacing between each of the meridians 407b in the second set is approximately 2°, such that the angular spacing between a meridian 407a from the first set and its adjacent meridians 407b from the second set is less than 1°. When the lens 401 is worn by a lens wearer, the lens wearer's eye will not be able to resolve the two different radial curvature power profiles.

Figure 6A:
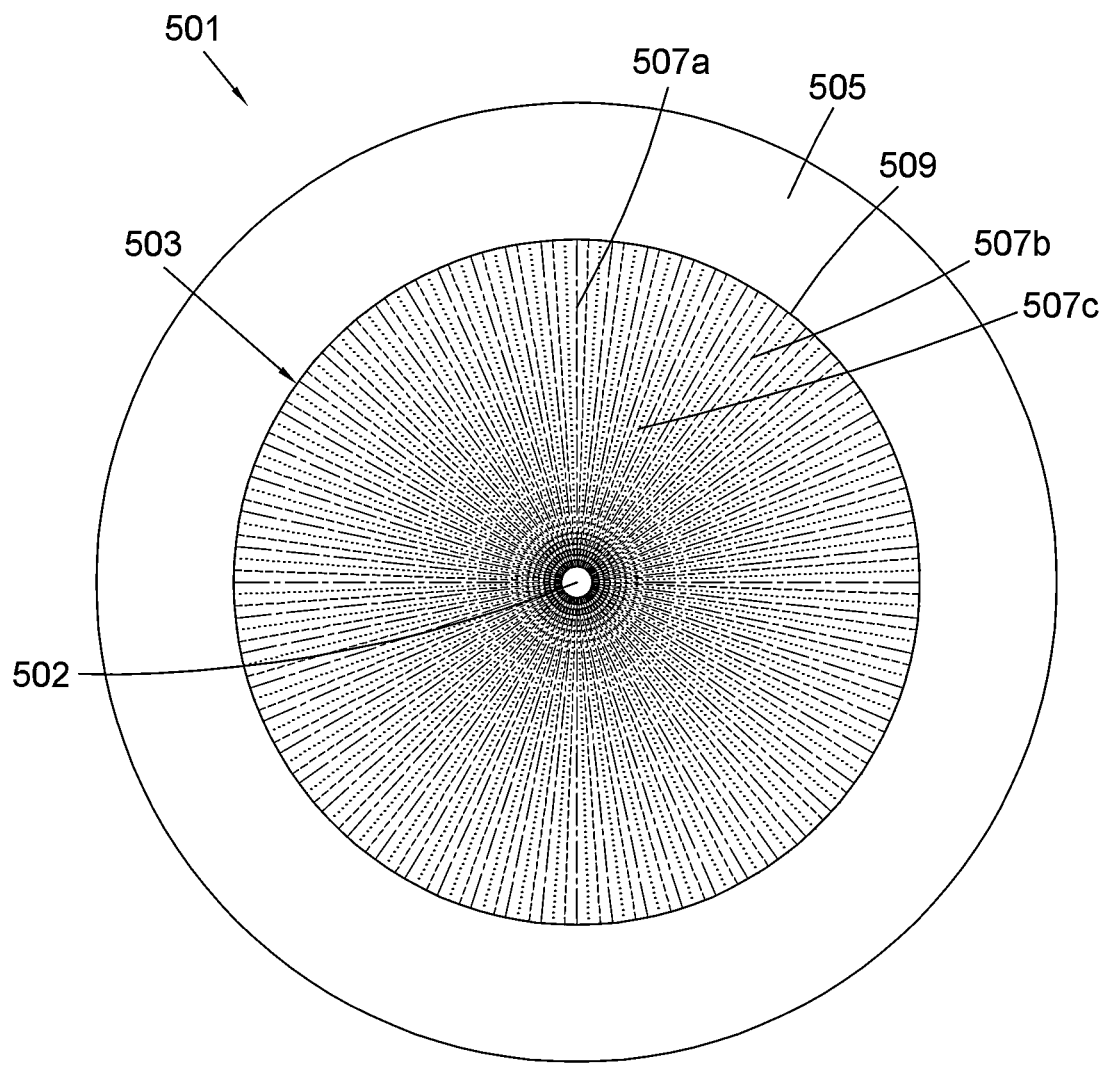
FIG. 6A is a schematic top view of a lens according to another embodiment of the present disclosure.
Figure 6B:
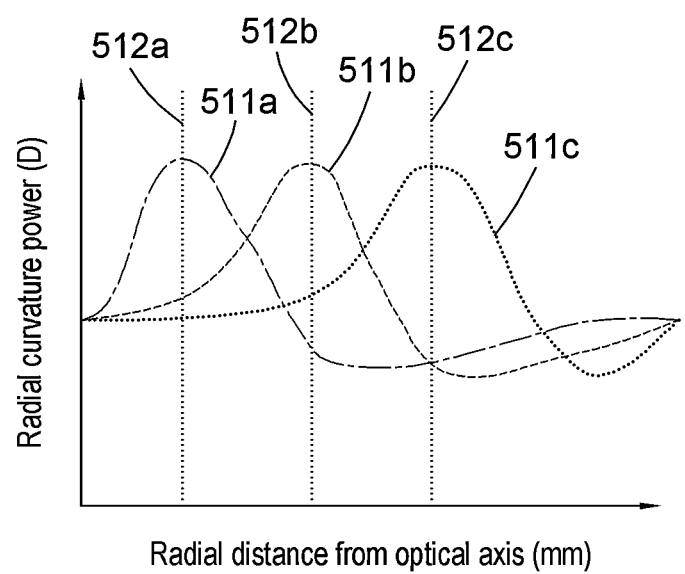
FIG. 6B is a is a plot showing the radial curvature power along two different meridians of the lens of FIG. 6A.

FIG. 6A shows a schematic top view of a lens 501 according to another embodiment of the present disclosure. The lens 501 includes an optic zone 503 centred on an optical axis 502, and a peripheral zone 505 surrounding the optic zone. A first meridian 507a (dot-dash line) extends from the optical axis 502 to a boundary 509 of the optic zone 503 and the peripheral zone 505. Along the first meridian 507a, the radial curvature power varies smoothly and continuously, and has a first radial curvature power profile 511a, as shown in FIG. 6B. The first radial curvature power profile 511a along this first meridian 507a has a peak in radial curvature power at a first radial distance from the optical axis (indicated by the dotted line 512a). A second meridian 507b (dashed line) extends from the optical axis 502 to the boundary 509 of the optic zone 503 and the peripheral zone 505. Along the second meridian 507b, the radial curvature power also varies smoothly and continuously having a second radial curvature power profile 511b, as shown in FIG. 6B. The second radial curvature power profile 511b along this second meridian 507b has a peak in radial curvature power at a second radial distance from the optical axis (indicated by the dotted line 512b). A third meridian 507c (dotted line) extends from the optical axis 502 to the boundary 509 of the optic zone 503 and the peripheral zone 505. Along the third meridian 507c, the radial curvature power also varies smoothly and continuously having a third radial curvature power profile 511c, as shown in FIG. 6B. The third radial curvature power profile 511c along this third meridian 507c has a peak in radial curvature power at a third radial distance from the optical axis (indicated by the dotted line 512c). Around the optic zone 503 (i.e., with varying angle θ), each meridian has a peak in radial curvature power at a different distance from the optical axis. The peaks therefore define a portion of a spiral extending in a circumferential direction around the optic zone 503.

As shown in FIG. 6A, around the optic zone 503, the angular spacing between meridians 507a, 507b, 507c is about 2°.

Figure 7A:
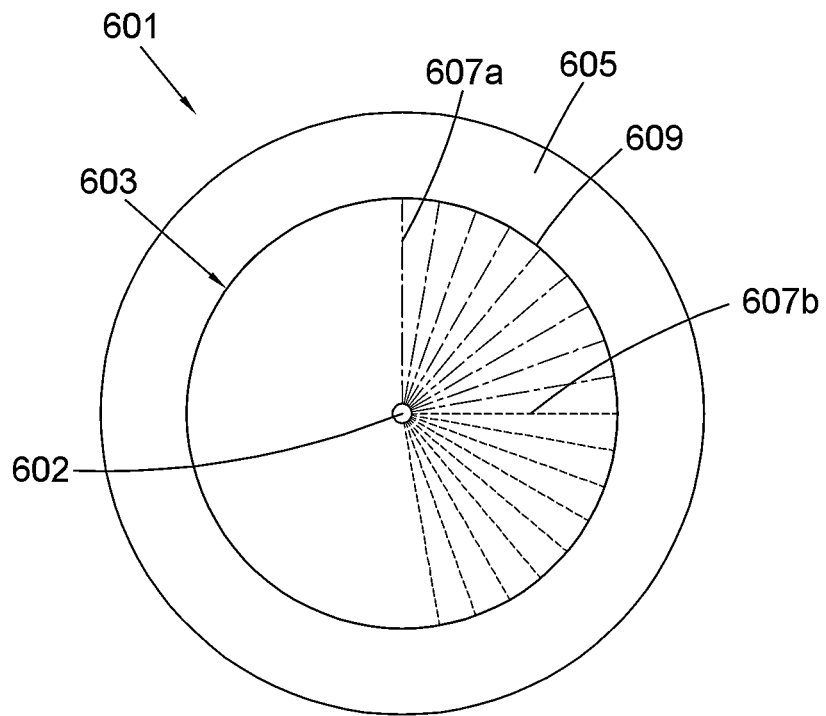
FIG. 7A is a schematic top view of a lens according to another embodiment of the present disclosure.

FIG. 7A shows a schematic top view of a lens 601 according to another embodiment of the present disclosure.

Figure 7B:
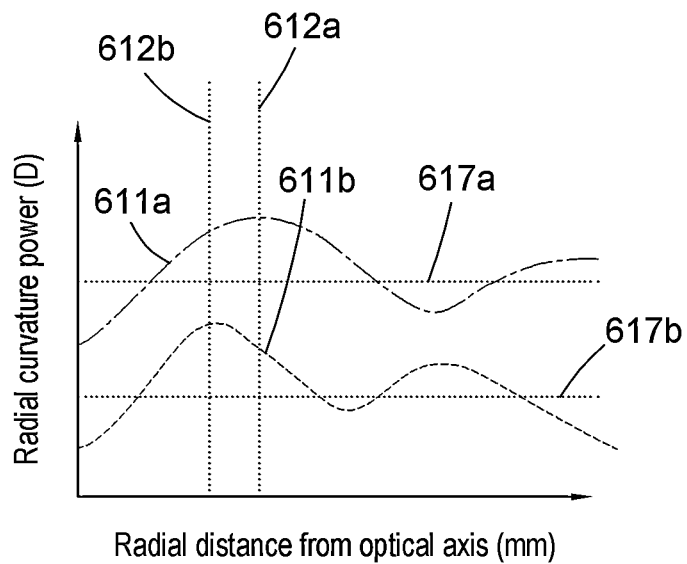
FIG. 7B is a is a plot showing the radial curvature power along two different meridians of the lens of FIG. 7A.

The lens 601 includes an optic zone 603 centred on an optical axis 602, and a peripheral zone 605 surrounding the optic zone 603. A first meridian 607a extends from the optical axis 602 to a boundary 609 of the optic zone 603 and the peripheral zone 605. Along the first meridian 607a, the radial curvature power varies smoothly and continuously, and has a first radial curvature power profile 611a, as shown in FIG. 7B. The first radial curvature power profile 611a along this first meridian 607a varies in a pseudo-random manner, with a global peak (i.e., absolute maximum value) in radial curvature power at a first radial distance from the optical axis (indicated by the dotted line 612a). The gradient of the first radial curvature power profile 611a varies with distance from the optical axis 602. A second meridian 607b extends from the optical axis 602 to the boundary 609 of the optic zone 603 and the peripheral zone 605. A second meridian 607b is orthogonal to the first meridian 607a, with the first meridian 607a lying along the line θ=0°, and the second meridian 607b lying along the line θ=90°. Along the second meridian 607b, the radial curvature power also varies smoothly and continuously having a second radial curvature power profile 611b, as shown in FIG. 7B. The second radial curvature power profile 611b along this second meridian 607b varies in a pseudo random manner with a global peak (i.e., absolute maximum value) in radial curvature power at a second, different distance from the optical axis (indicated by the dotted line 612b). The average radial curvature power (indicated by dotted line 617a in FIG. 7B) of the first radial curvature power profile 611a is higher than the average radial curvature power (indicated by dotted line 617b in FIG. 7B) of the second radial curvature power 611b. The first meridian 607a is part of a set of first meridians having the first radial curvature power profile 611a (only one first meridian 607a is labelled, others are indicated as dot-dash lines). The second meridian 607b is part of a set of second meridians having the second radial curvature power profile 611b (only one second meridian 607b is labelled, the others are indicated as dashed lines). Each meridian in the first set of meridians has a corresponding orthogonal meridian that is part of the second set of meridians (only one first meridian 607a is labelled, others are indicated as dot-dash lines), i.e., each meridian having the first radial curvature power profile 611a lies at 90° to a meridian having the second radial curvature power profile 611b. As a result, the optic zone 603 of the lens 601 has a toric power profile.

Figure 8:
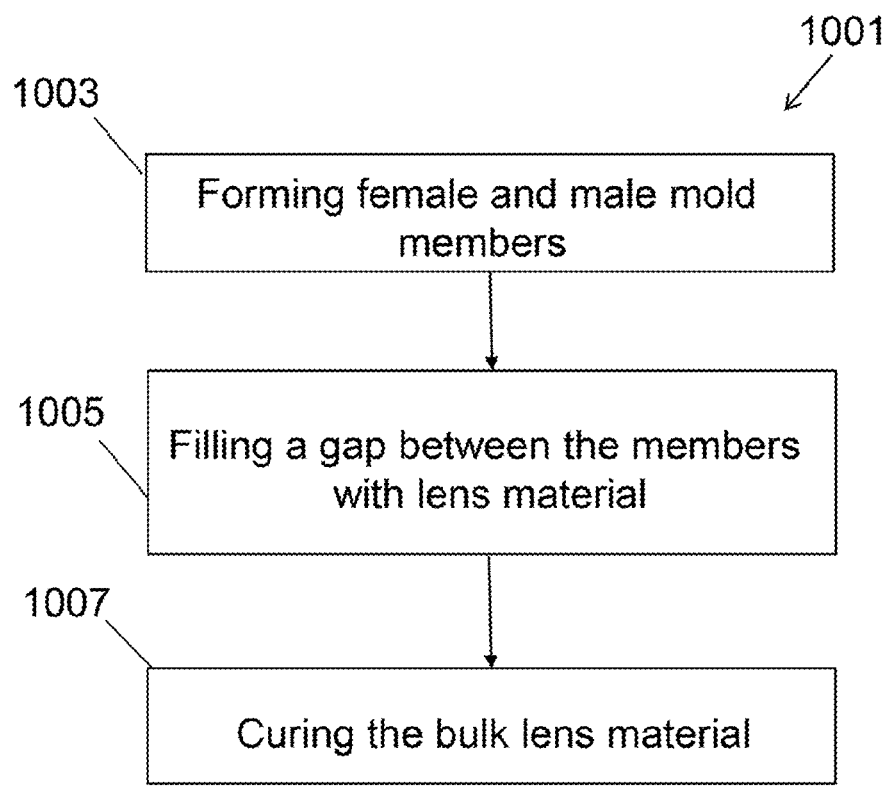
FIG. 8 is a flowchart showing a method of manufacturing a lens according to an embodiment of the present disclosure.

FIG. 8 is a flowchart showing a method 1001 of manufacturing a lens, according to an embodiment of the present disclosure. The lens includes an optic zone centred on an optical axis, and a peripheral zone surrounding the optic zone. Within the optic zone, along a first meridian the lens has a first radial curvature power profile that varies continuously in a first radial direction from the optical axis to the peripheral zone. Along a second meridian the lens has a second, different radial curvature power profile that varies continuously in a second radial direction from the optical axis to the peripheral zone. The lens may include any of the features set out above. In a first step 1003 the method comprises forming a female mold member with a concave lens forming surface and a male mold member with a convex lens forming surface. In a second step 1005, the method comprises filling a gap between the female and male mold members with bulk lens material. In a third step 1007, the method comprises curing the bulk lens material to form the lens.

In alternative embodiments of the present disclosure, the lens may be formed using a lathing process, spin cast molding processes, or lathing processes, or a combination thereof.

Figure 9:
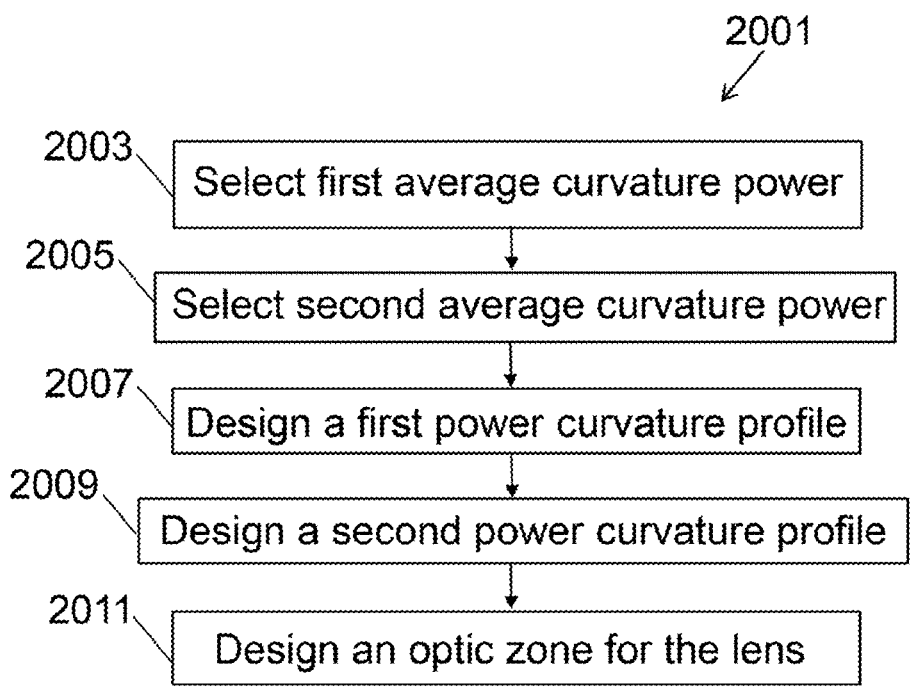
FIG. 9 is a flowchart showing a method of designing a lens according to an embodiment of the present disclosure.

FIG. 9 is a flowchart showing a method 2001 of designing lens, according to an embodiment of the present disclosure. The lens includes an optic zone centred on an optical axis, and a peripheral zone surrounding the optic zone. Within the optic zone, along a first meridian the lens has a first radial curvature power profile that varies continuously in a first radial direction from the optical axis to the peripheral zone. Along a second meridian the lens has a second, different radial curvature power profile that varies continuously in a second radial direction from the optical axis to the peripheral zone. The lens may include any of the features set out above. In a first step 2003 the method comprises selecting a first average radial curvature power value. In a second step 2005, the method comprises selecting a second, different average radial curvature power value. In a third step 2007, the method comprises designing a first curvature power profile that gives rise to the first average radial curvature power value. In a fourth step 2009, the method comprises designing a second curvature power profile that gives rise to the first average radial curvature power value. In a sixth step 2011, the method comprises designing an optic zone for the lens, wherein the optic zone comprises meridians having the first curvature power profile and meridians having the second curvature power profile.

It will be appreciated by those of ordinary skill in the art that features of these example embodiments may be combined in other embodiments that fall within the scope of the present disclosure. Whilst the present disclosure has been described and illustrated with reference to particular example embodiments, it will be appreciated by those of ordinary skill in the art that the disclosure lends itself to many different variations not specifically illustrated herein. By way of example only, certain possible variations will now be described.

In the example embodiments of the present disclosure described above, the lenses are substantially circular and have a peripheral zone with a substantially circular outer perimeter surrounding the optic zone. In embodiments of the present disclosure, in particular, in embodiments wherein the ophthalmic lens is a spectacle lens, the peripheral zone may have an outer perimeter that is not circular. The outer perimeter of the peripheral zone may be substantially oval, elliptical, or rectangular. The peripheral zone may be surrounded by a further, non-optically active zone.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. An ophthalmic lens, the lens including an optic zone centred on an optical axis, and a peripheral zone surrounding the optic zone, wherein within the optic zone, along each meridian in a first set of meridians, the lens has a first radial curvature power profile that varies continuously in a first radial direction from the optical axis to the peripheral zone, and along each meridian in a second, different set of meridians, the lens has a second, different radial curvature power profile that varies continuously in a second radial direction from the optical axis to the peripheral zone, wherein the first radial curvature power profile has an opposite shape to the second radial curvature power profile, wherein meridians from the first set of meridians and meridians from the second set of meridians form an alternating pattern around the lens, and wherein the angular spacing between each meridian in the first set of meridians is less than 5 degrees.

2. The ophthalmic lens according to claim 1, wherein the first curvature power profile has a first average radial curvature power value measured along each meridian in the first set of meridians and the second radial curvature power profile has a second, different average radial curvature power value measured along each meridian in the second set of meridians.

3. The ophthalmic lens according to claim 1, wherein the first curvature power profile has a first average radial curvature power value measured along each meridian in the first set of meridians and the second radial curvature power profile also has the first average radial curvature power value, measured along each meridian in the second set of meridians, and wherein the first radial curvature power profile has a different shape to the second radial curvature power profile.

4. The ophthalmic lens according to claim 1, wherein at the optical axis, at least one of the first radial curvature power profile and the second radial curvature power profile provides a distance power of between +0.5 and −25.0 D.

5. The ophthalmic lens according to claim 1, wherein at the optical axis, at least one of the first radial curvature power profile and the second radial curvature power profile provides a near power of between +0.5 and +25.0 D.

6. The ophthalmic lens according to claim 1, wherein at the optical axis, the first radial curvature power profile or the second radial curvature power profile provides a distance power, and the other of the first curvature power profile and the second curvature power profile provides a near power.

7. The ophthalmic lens according to claim 1, wherein at the optical axis, the first radial curvature power profile and the second radial curvature power profile have the same value, and at a boundary between the optic zone and the peripheral zone, the first radial curvature power profile and the second radial curvature power profile have different values.

8. The ophthalmic lens according to claim 1, wherein one of the first curvature power profile and the second curvature power profile increases monotonically in radial curvature power with increasing radial distance from the optical axis, and the other of the first curvature power profile and the second curvature power profile decreases monotonically in radial curvature power with increasing radial distance from the optical axis.

9. The ophthalmic lens according to claim 1, wherein one of the first curvature power profile and the second curvature power profile includes at least one peak at a first radial distance from the optical axis of the lens, and the other of the first curvature power profile and the second curvature power profile includes at least one trough at the first radial distance from the optical axis of the lens.

10. The ophthalmic lens according to claim 1, wherein the first curvature power profile has a peak in radial curvature power at a first radial distance from the optical axis, and the second curvature power profile has a peak in radial curvature power at a second, different distance from the optical axis.

11. The ophthalmic lens according to claim 1, wherein the first curvature power profile and/or the second curvature power profile span a power range of at least 5.0 D.

12. The ophthalmic lens according to claim 1, wherein the angular spacing between a meridian from the first set of meridians and an adjacent meridian from the second set of meridians is less than 1°.

13. The ophthalmic lens according to claim 1, wherein along at least one further meridian in the optic zone, the radial curvature power varies with a third radial power profile that is different to the second curvature power profile and the first curvature power profile.

14. The ophthalmic lens according to claim 1, wherein the radial curvature power of the optic zone results from a curvature of an anterior surface of the lens.

15. The ophthalmic lens according to claim 1, wherein the lens is a contact lens.

16. The ophthalmic lens according to claim 1, wherein the lens is a spectacle lens.

17. A method of manufacturing an ophthalmic lens, wherein the method comprises forming a lens according to claim 1.

18. A method of designing the ophthalmic lens according to claim 1, the method comprising:
  selecting a first average radial curvature power value;
  selecting a second, different average radial curvature power value;
  designing a first curvature power profile that gives rise to the first average radial curvature power value;
  designing a second curvature power profile that gives rise to the second average radial curvature power value; and
  designing an optic zone for the lens, wherein the optic zone comprises a first set of meridians having the first curvature power profile and a second set of meridians having the second curvature power profile, wherein the first radial curvature power profile has an opposite shape to the second radial curvature power profile, wherein meridians from the first set of meridians and meridians from the second set of meridians form an alternating pattern around the lens, and wherein the angular spacing between each meridian in the first set of meridians is less than 5 degrees.

* * * * *